(12) United States Patent
Van Der Velde

(10) Patent No.: US 12,414,058 B2
(45) Date of Patent: Sep. 9, 2025

(54) METHOD AND APPARATUS FOR PROVIDING USER EQUIPMENT ASSISTANCE INFORMATION

(71) Applicant: Samsung Electronics Co., Ltd., Suwon-si (KR)

(72) Inventor: Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 18/018,966

(22) PCT Filed: Aug. 6, 2021

(86) PCT No.: PCT/KR2021/010442
§ 371 (c)(1),
(2) Date: Jan. 31, 2023

(87) PCT Pub. No.: WO2022/031126
PCT Pub. Date: Feb. 10, 2022

(65) Prior Publication Data
US 2023/0309033 A1  Sep. 28, 2023

(30) Foreign Application Priority Data

Aug. 7, 2020 (GB) ..................... 2012347
Jul. 26, 2021 (GB) ..................... 2110710

(51) Int. Cl.
*H04W 56/00* (2009.01)
*H04W 36/00* (2009.01)
*H04W 36/36* (2009.01)

(52) U.S. Cl.
CPC ....... *H04W 56/001* (2013.01); *H04W 36/362* (2023.05); *H04W 36/0069* (2018.08)

(58) Field of Classification Search
CPC ............. H04W 56/001; H04W 36/362; H04W 36/0069; H04W 8/24; H04W 76/15; H04W 88/06
See application file for complete search history.

(56) References Cited

U.S. PATENT DOCUMENTS

| 2019/0045404 A1 | 2/2019 | Tsai et al. | |
| 2022/0132625 A1* | 4/2022 | Mattam | H04W 76/19 |
| 2023/0171828 A1* | 6/2023 | Wang | H04W 52/367 |
| | | | 370/329 |

OTHER PUBLICATIONS

European Search Report dated Dec. 18, 2023, issued in European Application No. 21854555.6.
3GPP; 3rd Generation Partnership Project; Technical Specification Group Radio Access Network; NR; Radio Resource Control (RRC) protocol specification (Release 16); 3GPP TS 38.331; V16.1.0; Jul. 2020; Valbonne, France.

(Continued)

*Primary Examiner* — Kyaw Z Soe
(74) *Attorney, Agent, or Firm* — Jefferson IP Law, LLP

(57) ABSTRACT

A method for providing user equipment (UE) assistance information, performed by a UE, the method comprises: connecting to a first master node (MN) via a master cell group (MCG); connecting to a first secondary node (SN) via a secondary cell group SCG; transmitting, to the first SN, the UE assistance information via the first MN; receiving, from a base station, a message for reconfiguration with sync for the MCG; and retransmitting, to the first SN, the UE assistance information.

14 Claims, 8 Drawing Sheets

(56) References Cited

OTHER PUBLICATIONS

Mediatek Inc, Summary of [Post109bis-e][939][PowSav] RRC open issues (Mediatek); 3GPP TSG-RAN WG2 Meeting #110e; R2-2004945; Jun. 1-12, 2020; Online.

Qualcomm Incorporated; Correction to re-sending UEAssistanceInformation upon reconfiguration w/sync; 3GPP TSG-RAN WG2 Meeting #110-e; R2-2005636; Jun. 1-12, 2020; Online.

ETSI; Universal Mobile Telecommunications System (UMTS); LTE; 5G; NR; Multi-connectivity; Overall description; Stage-2 (3GPP TS 37.340 version 16.2.0 Release 16); ETSI TS 137 340; V16.2.0; Sep. 2020; France.

Huawei et al.; Report for [Post109bis-e][050][TEI16] Overheating; 3GPP TSG-RAN WG2 Meeting #110-e; R2-2005401; Jun. 1-12, 2020; Electronic.

Samsung; Consideration on overheating assistance from the perspective of time-domain allocation; 3GPP TSG-RAN2 Meeting#110-e; R2-2005417; Jun. 1-12, 2020; Online.

United Kingdom Office Action dated Apr. 11, 2022; United Kingdom Appln. No. 2110710.7.

International Search Report with Written Opinion dated Nov. 15, 2021; International Appln. No. PCT/KR2021/010442.

\* cited by examiner

[Fig. 1]
Fallback band combination : A band combination that would result from another band combination by releasing at least one SCell or uplink configuration of SCell, or SCG. An intra-band non-contiguous band combination is not considered to be a fallback band combination of an intra-band contiguous band combination.

[Fig. 2]
```
ConfigRestrictInfoSCG : : =          SEQUENCE {
    allowedBC-ListMRDC               BandCombinationInfoList
OPTIONAL,
        - - Not relevant parts omitted BandCombinationInfoList : : =        SEQUENCE (SIZE (1..maxBandComb))
OF BandCombinationInfo BandCombinationInfo : : =            SEQUENCE {
    bandCombinationIndex             BandCombinationIndex,
    allowedFeatureSetsList           SEQUENCE (SIZE
(1. .maxFeatureSetsPerBand)) OF FeatureSetEntryIndex
{

FeatureSetEntryIndex : : =           INTEGER (1..
maxFeatureSetsPerBand)
```

*allowedBC-ListMRDC*
A list of indices referring to band combinations in MR-DC capabilities from which SN is allowed to select the SCG band combination. Each entry refers to:
- a band combination numbered according to *supportedBandCombinationList* in the *UE-MRDC-Capability* (in case of (NG)EN-DC), or according to *supportedBandCombinationList* and *supportedBandCombinationListNEDC-Only* in the *UE-MRDC-Capability* (in case of NE-DC), or according to *supportedBandCombinationList* in the UE-NR-Capability (in case of NR-DC),
- and the Feature Sets allowed for each band entry. All MR-DC band combinations indicated by this field comprise the MCG band combination, which is a superset of the MCG band(s) selected by MN.

[Fig. 3]

| BC | BL1 | BL2 | BN1 | BN2 | BN3 | BN4 |
|---|---|---|---|---|---|---|
| BC1 | X | X | X | X | X |  |
| BC2 |  | X | X | X | X | X |
| BC3 | X |  | X | X |  |  |

BCX: Band combination X
BLY: LTE band Y
BNZ: NR band Z

[Fig. 4]

*allowedBC-ListMRDC*

A list of indices referring to band combinations in MR-DC capabilities from which SN is allowed to select the SCG band combination. Each entry refers to:

- a band combination numbered according to *supportedBandCombinationList* in the *UE-MRDC-Capability* (in case of (NG)EN-DC), or according to *supportedBandCombinationList* and *supportedBandCombinationListNEDC-Only* in the *UE-MRDC-Capability* (in case of NE-DC), or according to *supportedBandCombinationList* in the UE-NR-Capability (in case of NR-DC). <u>This may involve signalling an additional field ( *fallBandCombination* ) when MN wants to allow a fallback BC of a superset BC that UE indicated in UE capabilities,</u>

- and the Feature Sets allowed for each band entry. All MR-DC band combinations indicated by this field comprise the MCG band combination, which is a superset of the MCG band(s) selected by MN.

<u>If the *allowedBC-ListMRDC-vNxy* is present, it shall contain the same number of entries, listed in the same order as in the *allowedBC-ListMRDC* (without suffix).</u>

*<u>fallBackBandCombination</u>*

<u>Indicates which bands of the concerned band combination belong to the fallback BC. The first/leftmost bit corresponds to the band listed first in bandList of the concerned band combination, the second bit corresponds to the second band in bandList of the concerned band combination and so on. Value 1 indicates that the band belongs to the fallback BC.</u>

[Fig. 5]

<u>ConfigRestrictInfoSCG-vNxy ::=      SEQUENCE {</u>
<u>    allowedBC-ListMRDC-vNxy          BandCombinationInfoList-vNxy           OPTIONAL</u>
<u>}</u>

<u>BandCombinationInfoList-Nxy ::=      SEQUENCE (SIZE (1..maxBandComb)) OF BandCombinationInfo-vNxy</u>

<u>BandCombinationInfo-vNxy ::=      SEQUENCE {</u>
<u>    fallBackBandCombination-vNxy      BIT STRING ((SIZE (1..maxBandC OPTIONAL,</u>
<u>}</u>

[Fig. 6]
5.3.5.3   Reception of an *RRCReconfiguration* by the UE

<Cut until relevant part>

2> if *reconfigurationWithSync* was included in *masterCellGroup* or *secondaryCellGroup*; and
2> if the UE transmitted a *UEAssistanceInformation* message for the corresponding cell group during the last 1 second, and the UE is still configured to provide UE assistance information for the corresponding cell group:
　　3> initiate transmission of a *UEAssistanceInformation* message for the corresponding cell group in accordance with clause 5.7.4.3;

[Fig. 7]
2> if *reconfigurationWithSync* was included in *masterCellGroup*; and
2> if the UE transmitted a *UEAssistanceInformation* message via SRB1during the last 1 second, and the UE is still configured to provide the concerned UE assistance information:
　　3> initiate transmission of a *UEAssistanceInformation* message to transfer the concerned UE Assistance information in accordance with clause 5.7.4.3;
2> if *reconfigurationWithSync* was included in *econdaryCellGroup*; and
2> if the UE transmitted a *UEAssistanceInformation* message via SRB3 during the last 1 second, and the UE is still configured to provide the concerned UE assistance information:
　　3> initiate transmission of a *UEAssistanceInformation* message to transfer the concerned UE Assistance information in accordance with clause 5.7.4.3;

[Fig. 8]
2> if the *reportType* is set to *periodical* in the *VarLogMeasConfig* :
　　3> if the UE is camping normally on an NR cell and if the RPLMN is included in *plmn-IdentityList* stored in *VarLogMeasReport* and, if the cell is part of the area indicated by *areaConfiguration* if configured in *VarLogMeasConfig*:
　　　　4> perform the logging at regular time intervals, as defined by the *loggingInterval* in the *VarLogMeasConfig;g*;

[Fig. 9A]
5.5a.3.2     Initiation

While T330 is running, the UE shall:
　1> perform the logging in accordance with the following:
　　2> if the *reportType* is set to *periodical* in the *VarLogMeasConfig* :
　　　3> if the UE is camping normally on an NR cell and if the RPLMN is included in *plmn-IdentityList* stored in *VarLogMeasReport* and;
　　　3> if *areaConfiguration* is not included in *VarLogMeasConfig* or the NR serving cell is part of the area indicated by *areaConfig*; and:
　　　3> if *targetFreqList* is not included in *VarLogMeasConfig* or the UE has measurement results available concerning the frequencies and cells, for frequencies for which *cellList* is configured, indicated by *targetFreqList*:
　　　　4> perform the logging at regular time intervals, as defined by the *loggingInterval* in the *VarLogMeasConfig* ;

[Fig. 9B]
```
AreaConfiguration-r16  ::=           SEQUENCE {
    areaConfig-r16                       AreaConfig-r16,
    targetFreqList-r16                   SEQUENCE(SIZE (1..maxFreq)) OF
TargetFreqInfo-r16                   OPTIONAL - - Need R
}

AreaConfig-r16  ::=     CHOICE {
    cellGlobalIdList-r16                 CellGlobalIdList-r16,
    trackingAreaCodeList-r16             TrackingAreaCodeList-r16,
    trackingAreaIdentityList-r16         TrackingAreaIdentityList-r16
}

InterFreqTargetFreqInfo-r16      ::=     SEQUENCE {
    dl-CarrierFreq                   ARFCN-ValueNR,
    cellList                         SEQUENCE (SIZE (1..32)) OF
PhysCellId   OPTIONAL
}
```

AreaConfiguration field descriptions
*InterFreqTtargetFreqInfo*
and possibly the neighbouring cells for which UE is requested to perform measurement logging. The network only includes the serving frequency and frequencies listed in SIB4 (i.e. logging is not supported for non-camping frequencies for which the UE may have results available based on early measurements that network may have configured).

[Fig. 10A]
9.1.1.1    HANDOVER REQUEST
This message is sent by the source NG-RAN node to the target NG-RAN node to request the preparation of resources for a handover.
Direction: source NG-RAN node → target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Only relevant parts are shown | | | | | | |
| >RRC Context | M | | OCTET STRING | Either includes the HandoverPreparationInformation message as defined in subclause 10.2.2. of TS 36.331 [14], or the HandoverPreparationInformation-NB message as defined in subclause 10.6.2 of TS 36.331 [14], if the target NG-RAN node is an ng-eNB, or the HandoverPreparationInformation message as defined in subclause 11.2.2 of TS 38.331 [10], if the target NG-RAN node is a gNB. | – | |
| Conditional Handover Information | O | | | | YES | reject |
| >CHO Trigger | M | | ENUMERATED (CHO initiation, CHO-replace, ...) | | | |
| >Target NG-RAN node UE XnAP ID | C-ifCHOmod | | NG-RAN node UE XnAP ID 9.2.3.16 | Allocated at the target NG-RAN node | | |
| >Estimated Arrival Probability | O | | INTEGER (1..100) | | | |

[Fig. 10B]

9.1.1.2     HANDOVER REQUEST ACKNOWLEDGE

This message is sent by the target NG-RAN node to inform the source NG-RAN node about the prepared resources at the target.

Direction: target NG-RAN node → source NG-RAN node.

| IE/Group Name | Presence | Range | IE type and reference | Semantics description | Criticality | Assigned Criticality |
|---|---|---|---|---|---|---|
| Message Type Type | M | | 9.2.3.1 | | YES | reject |
| Only relevant parts are shown | | | | | | |
| Target NG-RAN node To Source NG-RAN node Transparent Container | M | | OCTET STRING | Either includes the *HandoverCommand* message as defined in subclause 10.2.2 of TS 36.331 [14], if the target NG-RAN node is an ng-eNB, or the *HandoverCommand* message as defined in subclause 11.2.2 of TS 38.331 [10], if the target NG-RAN node is a gNB. | – | |
| Conditional Handover Information | O | | | | YES | reject |
| >Requested Target Cell ID | M | | Target Cell Global ID 9.2.3.25 | Target cell indicated in the corresponding HANDOVER REQUEST message | | |
| >Maximum Number of CHO Preparations | O | | 9.2.3.101 | | | |

[Fig. 11]
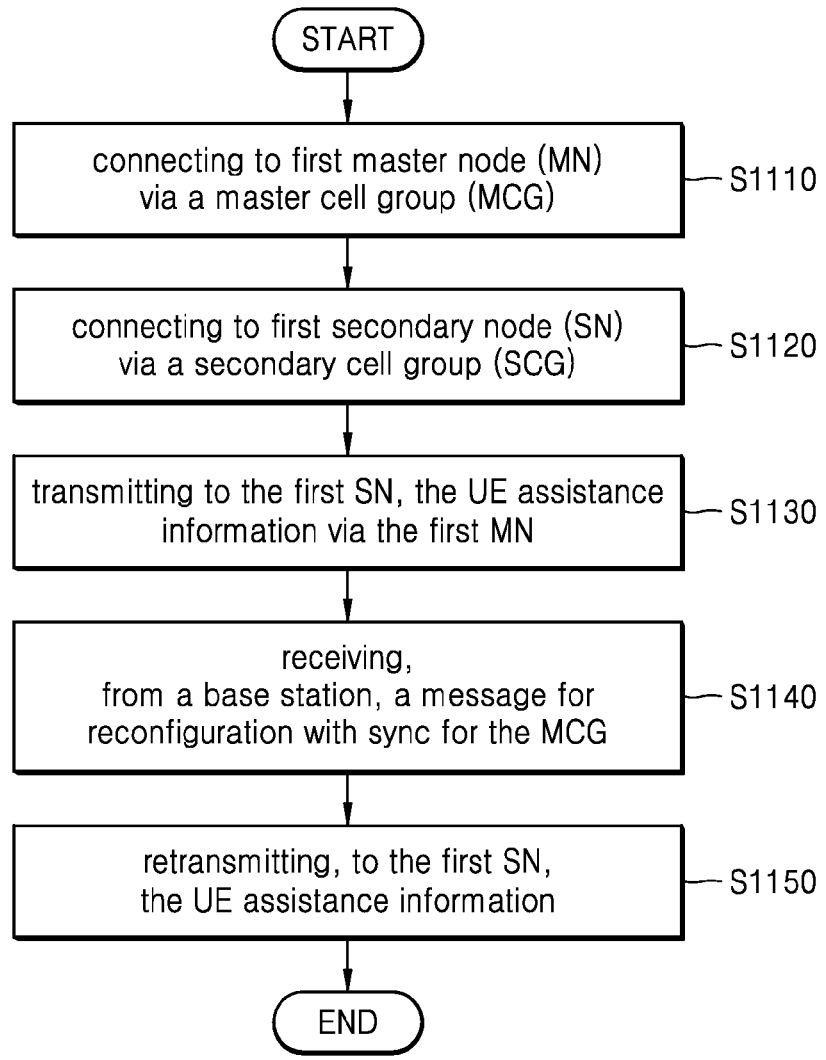
[Fig. 12]
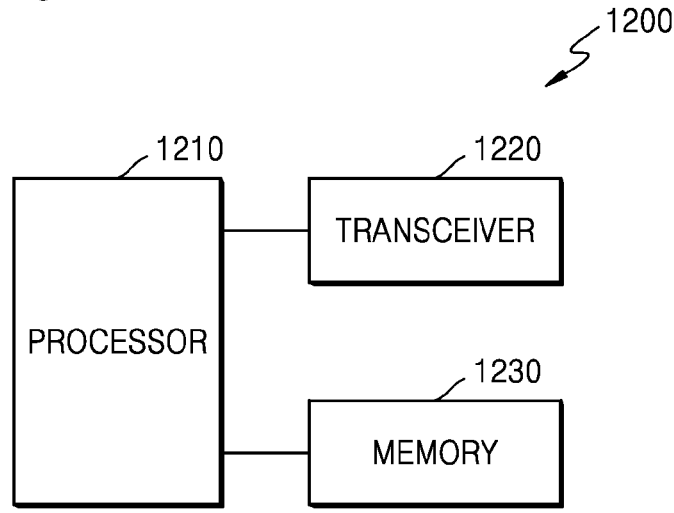

[Fig. 13]
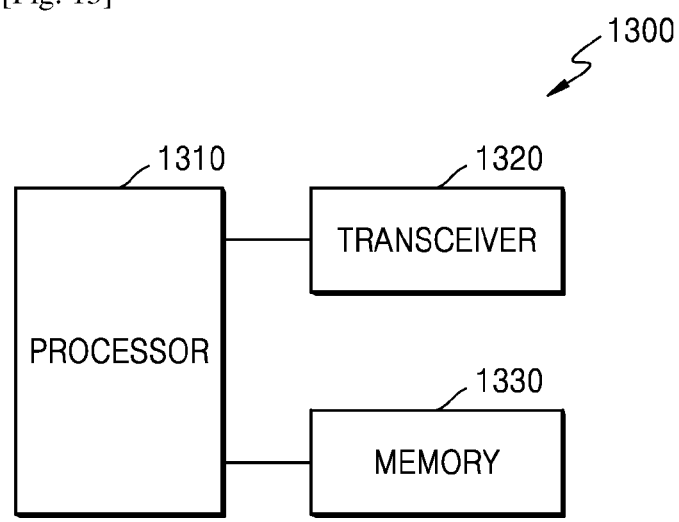

METHOD AND APPARATUS FOR PROVIDING USER EQUIPMENT ASSISTANCE INFORMATION

TECHNICAL FIELD

The present invention relates to a radio resource control (RRC).

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), nonorthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

DISCLOSURE OF INVENTION

Solution to Problem

Methods and apparatuses for providing user equipment (UE) assistance information are provided. A method for providing user equipment (UE) assistance information, performed by a UE, the method comprises: connecting to a first master node (MN) via a master cell group (MCG); connecting to a first secondary node (SN) via a secondary cell group (SCG); transmitting, to the first SN, the UE assistance information via the first MN; receiving, from a base station, a message for reconfiguration with sync for the MCG; and retransmitting, to the first SN, the UE assistance information.

BRIEF DESCRIPTION OF DRAWINGS

For a better understanding of the invention, and to show how exemplary embodiments of the same may be brought into effect, reference will be made, by way of example only, to the accompanying diagrammatic Figures, in which:

FIG. 1 is an extract from TS 38.306, defining a fallback band combination;

FIG. 2 is an extract from TS 38.331 (Rel-16 RRC), defining parameter ConfigRestrictInfoSCG and defining allowedBC-ListMRDC;

FIG. 3 is an example of supported band combinations;

FIG. 4 shows signalling details for solution option 1 for UE capability coordination in Dual Connectivity (DC) for fallbacks band combinations not in UE capabilities;

FIG. 5 shows changes to ConfigRestrictInfoSCG for solution option 1 for UE capability coordination in Dual Connectivity (DC) for fallbacks band combinations not in UE capabilities;

FIG. 6 is an extract from Rel-16 RRC (5.3.5.3 Reception of an RRCReconfiguration by the UE);

FIG. 7 shows changes to Rel-16 RRC (5.3.5.3 Reception of an RRCReconfiguration by the UE);

FIG. 8 is an extract from TS 38.331 (Rel-16 RRC 5.5a.3.2 Initiation);

FIG. 9A shows changes to Rel-16 RRC 5.5a.3.2 Initiation;
FIG. 9B shows changes to Rel-16 RRC 5.5a.3.2 Initiation;
FIG. 10A is an extract from 38.423 v16.2.0;
FIG. 10B is an extract from 38.423 v16.2.0;
FIG. 11 is a flow diagram of operation performed by a base station according to an embodiment of the present disclosure;
FIG. 12 illustrates a gNB according to an embodiment of the present disclosure; and
FIG. 13 illustrates a user equipment (UE) according to an embodiment of the present disclosure.

MODE FOR THE INVENTION

Generally, described herein are signalling enhancements to Rel-16 RRC, covering the following cases:
1 UE capability coordination in DC for fallbacks not in UE capabilities;

2 In DC, repetition of SCG specific assistance upon change of PCell;

3 Avoiding MDT logging when measurements for target frequencies are unavailable; and 4 Inter-node signalling upon reconfiguration of PCell when CHO is configured.

1. UE Capability Coordination in DC for Fallbacks not in UE Capabilities

A first aspect provides a method of user equipment, UE, capability coordination in Dual Connectivity, DC, in a network, wherein the method comprises setting a fallback band combination, BC, for the UE.

A second aspect provides a network including a user equipment, UE, for capability coordination in Dual Connectivity, DC, wherein the network is configured to set a fallback band combination, BC, for the UE.

2. In DC, Repetition of SCG Specific Assistance Upon Change of PCell.

A third aspect provides a method of managing user equipment, UE, assistance information in Dual Connectivity, DC, in a network, wherein the method comprises providing the UE assistance information prior to reconfiguration with sync.

A fourth aspect provides a network including a user equipment, UE, for managing user equipment, UE, assistance information in Dual Connectivity, DC, wherein the network is configured to provide the UE assistance information prior to reconfiguration with sync.

3. Avoiding MDT Logging when Measurements for Target Frequencies are Unavailable A fifth aspect provides a method of managing user equipment, UE, measurement logging in a network including a UE, wherein the method comprises configuring the UE to only log results requested (for example, wanted) by the network.

A sixth aspect provides a network including a user equipment, UE, for managing UE measurement logging, wherein the network is configured to configure the UE to only log results requested by the network.

4. Inter-Node Signalling Upon Reconfiguration of PCell when CHO is Configured

A seventh aspect provides a method of inter-node signalling upon reconfiguration of PCell when CHO is configured in a network including a user equipment, UE, the method comprising returning, by a target node to a source node, a handover request acknowledgement upon reconfiguration of PCell when CHO is configured.

An eighth aspect provides a network including a user equipment, UE, for inter-node signalling upon reconfiguration of PCell when CHO is configured, wherein the network is configured to return, by a target node to a source node, a handover request acknowledgement upon reconfiguration of PCell when CHO is configured.

1. UE Capability Coordination in Dual Connectivity (DC) for Fallbacks Band Combinations not in UE Capabilities 1.1 Introduction In case a UE is configured with Dual Connectivity, the UE is connected via a Master Cell Group (MCG) to a Master Node (MN) and a Secondary Cell Group (SCG) to a Secondary Node (SN). Each node sets the parameters the cell group it controls, but the nodes interact to ensure that UE capabilities are respected. This is needed, as what UE can support for SCG may depend on what is configured for MCG. As an example, such coordination is needed to ensure that the nodes together configure a band combination (BC) in accordance with UE capabilities. There are several different cases of Dual Connectivity, including cases in which MCG and SCG use a different Radio Access Technology. For example, the UE can be configured with an MCG using LTE and an SCG using NR. This invention in particular addresses DC cases for which one of the cell groups uses NR. We will use the general term Multi RAT Dual Connectivity (MR-DC) to refer to these DC cases. This is meant to include the case of NR DC i.e. with both MCG and SCG using NR.

The UE signals its capabilities to the network. In case of MR-DC, with MCG using LTE and SCG using NR the UE signals its capabilities by 3 different parts:

a) LTE capabilities, that are used by the LTE eNB;

b) NR capabilities, that are used by the NR gNB; and c) MR-DC capabilities, that are used by both LTE eNB and NR gNB.

As the UE capabilities can be quite large, methods have been defined to reduce the size. One such option is that UE omits band combinations that are fallbacks from another band combination that is included in the UE capabilities. See the definition in FIG. 1.

1.2 Technical Problem, Basics

The MN can set restrictions regarding the configuration that SN can configure, for example by the parameter ConfigRestrictInfoSCG within CG-ConfigInfo inter-node message that it sends to SN. The parameter ConfigRestrictInfoSCG amongst other things includes the allowedBC-ListMRDC as shown in FIG. 2.

The CG-ConfigInfo message is used by master eNB or gNB to request the SgNB or SeNB to perform certain actions e.g. to establish, modify or release an SCG. The message may include additional information e.g. to assist the SgNB or SeNB to set the SCG configuration. It can also be used by a central unit (CU) to request a distributed unit (DU) to perform certain actions, e.g. to establish, or modify an MCG or SCG. Direction: Master eNB or gNB to secondary gNB or eNB, alternatively CU to DU.

It is important to note that the allowedBC-ListMRDC refers to band combinations that the UE includes within the UE capabilities that it signals to the network, in particular to the within the MR-DC capabilities (e.g. by field supportedBandCombinationList in RF-ParametersMRDC within UE-MRDC-Capability, see FIG. 2).

In case the UE reports a superset band combination (BC) and omits fallback band combinations that it supports, there is a problem namely that the MN is unable to indicate the omitted fallback combinations in the allowedBC-ListMRDC. This means, the MN may not be able to signal the required configuration restriction to SN. The problem is further illustrated by an example.

1.3 Technical Problem, Example

UE Capabilities

FIG. 3 shows an example of supported band combinations that the UE reports within its UE capabilities.

Symbol x in FIG. 3 denotes that the concerned band is part of the band combination. For example, BC1 comprises BL1, BL2, BN1, BN2 and BN3. It is noted that in this example, the UE report band combinations BC1 and BC2, but none of the fallbacks that it also supports.

MR-DC and Allowed BCs for SN to Configure

In this section we are considering some case in which the signalling limitations may or may not result in real problems for the network.

[Case 1]
 MN configures PCell on BL2.
 At T1, MN may be fine if SN configures BN1 . . . BN4.
 At T2, MN may want to restrict SN to configure cells on BN1 . . . BN3 so there is room available to configure an MCG SCell on BL1.
 In this case, network can refer to BC1 within allowedBC-ListMRDC i.e. there is no problem.
[Case 2]
 MN Configures PCell on BL2.
 At T3, MN may want to restrict SN to configure cells on BN1, BN2 so there is room available to configure the MCG PCell on BL1.
 To restrict SN, allowedBC-ListMRDC should refer to BC3 which seems not allowed as it is not a superset of the MCG band(s) selected by MN.
[Other Cases]
 It should be noted that the above are merely some potential examples. That is, there may be several other relevant cases in which MN may want to restrict the band combinations that SN can configure, that are not possible due to the current limitations in the inter-node signalling as identified previously.
1.4 Potential Solutions
 In this section we are considering different solutions to the problem.
 Option 1: Extending allowed BC list for MRDC with a bit string indicating the bands belonging to the desired fallback
  The characteristics of this solution are as follows:
  The allowedBC-ListMRDC is extended by a field fall-BackBandCombination that is used when the network wants to indicate a fallback band combination not explicitly signalled in the UE capabilities;
  The field fallBackBandCombination concerns a bit string with each indicating which of the bands of the (superset) band combination that is referenced by the bandCombinationIndex (as included in current standards) are part of the fallback band combination that MN wants to set as allowed BC;
  Further details regarding the signalling are provided in FIG. 4; and
  No changes are foreseen regarding the feature set, since UE capabilities for the fallback BC are assumed to be same as for the (superset) band combination indicated (as otherwise UE would not have omitted the fallback band combination in UE capabilities).
 The changes are illustrated by ASN.1 (FIG. 5), which shows changes to ConfigRestrictInfoSCG (labelled as ConfigRestrictInf2oSCG-vNxy).
 Option 2: Re-Use Parameters Present in Existing Inter-Node Signalling
 In this solution, the MN re-uses (or mis-uses) parameters present in existing internode signalling that were originally intended for other purposes. For example, the MN may set these to values other than they were originally intended for, merely to enforce certain configuration restrictions to be observed by SN.
 In particular, the parameters introduced to avoid overheating could be re-used. Furthermore, the SN may use some parameter indicating the configuration selected by MN. It should be noted that these other existing parameters may be used in addition to the allowedBC-ListMRDC.
 The solution is illustrated by the following example:
 Parameters indicating configuration restrictions:
  MN indicates the superset BC within allowedBC-ListMRDC
  Parameters indicating current MCG configuration
  MN indicates the serving frequencies (MN using NR)
  MN indicates the selected band entries (in NR-DC)
  Parameters indicating overheating related restrictions:
   maxCCsXL (in (NG)EN-DC, NR-DC)
   maxBW-FRx-XL (in NR-DC)
   maxMIMO-Layers-FRx-XL (in NR-DC)
  As indicated previously, MN can set some of the other parameters to a different value than intended according to the current specification, merely to impose a configuration restriction on SN. As an example, MN may the set selected band entries to include bands that are currently not selected/configured
1.5 Advantages
 In this section, the merits and drawbacks of the different solutions to the problem are considered (Table 1).

TABLE 1

Merits and drawbacks of the different solutions to the problem of UE capability coordination in Dual Connectivity (DC) for fallbacks band combinations not in UE capabilities.

| Option | Merits (+) and drawbacks (−) |
| --- | --- |
| Option 1 | − Signalling changes are required<br>+ It is possible to set the same detailed restrictions as when UE would have included the fallback band combination in UE capabilities |
| Option 2 | + No signalling changes are required<br>− Control is rather crude i.e. it is not possible to set the same detailed restrictions as when UE would have included the fallback band combination in UE capabilities. I.e. network can merely set some rather crude restrictions<br>− There may be limitations regarding the setting of the parameters imposed by their original intention<br>− Misuse of the parameters may result in inter-operability problems (e.g. when MN and SN are from different vendors) |

2. Repetition of SCG Specific UE Assistance in Dual Connectivity
2.1 Introduction
 In case a UE is configured with Dual Connectivity, the UE is connected via a Master Cell Group (MCG) to a Master Node (MN) and a Secondary Cell Group (SCG) to a Secondary node (SN). Each node sets the parameters the cell group it controls, butthe nodes also interact e.g. to ensure that UE capabilities are respected (as described previously).
 The UE can provide assistance to the network, to inform the network of its preferences regarding the radio configuration. This assistance may include reporting of problems the UE is experiencing like overheating or In-Device Coexistence. Until recently, the information was reported to MN and concerned the entire UE. Within R16 of NR, cell group specific UE assistance was introduced for power saving purposes. For this feature, the UE may report preferences regarding the MCG configuration to MN and preferences regarding the SCG configuration to the SN. This may concern preferences regarding the maximum bandwidth, the number of SCells (Component Carriers), discontinuous reception (DRX) settings and so on.
 In case of UE mobility, the UE assistance information that UE has just provided to the network may be lost. For example, in case of change of MN, the source MN may receive the assistance after it initiated handover preparations towards the target MN, in which case it is unable to forward the received information. To overcome this, the UE repeats transfer of the same UE assistance information after completing the concerned handover procedure (or after reconfiguration with sync, when using NR terminology).

The UE assistance is carried by RRC messages that are transferred via Signalling Radio Bearers (SRBs). The (uplink) signalling information to be transferred from UE to SN can either be transferred directly via SRB3, or in-directly via the MN using SRB1. The latter case applies in case SRB3 is not configured (i.e. SRB3 configuration is up to network implementation).

Table 2 provides a summary of the different UE assistance cases defined so far.

TABLE 2

Summary of different UE assistance cases defined so far.

| Case | Description | Scenarios | Remarks |
| --- | --- | --- | --- |
| A | Assistance regarding UE/MCG and reported via SRB1 | | Baseline from LTE |
| B | Assistance regarding SCG and reported via SRB3 | (NG)EN-DC, NR-DC | Used only for: NR SCG and only for power saving related features |
| C | Assistance information regarding SCG and reported via SRB1 (includes IRAT MRDC cases) | (NG)EN-DC, NR-DC | As above |

It should be noted that other use cases may however be introduced in future and hence should not be excluded.

2.2 Technical Problem, Basics

As mentioned in the previous, UE is required to repeat UE assistance if there is a risk the information is lost during UE mobility. In standards, this is realized as shown by the extract from NR RRC (FIG. 6).

According to the extract shown in FIG. 6, the UE thus repeats information it transmitted within 1 second preceding a reconfiguration with sync procedure. According to the extract shown in FIG. 6, such procedure is specific to a cell group. For example, in case of change of MN, a reconfiguration with sync is performed for the master cell group (MCG), while for a case of change of SN, a reconfiguration with sync is performed for the secondary cell group (SCG). A combination is possible also.

Issue 1: Missing repetition of SCG assistance transferred via MN upon change of MN The current standards indicate that upon reconfiguration with sync for the MCG, the UE repeats the UE assistance transmit procedure only if the UE transmitted assistance information concerning the MCG. That is, if the UE reported assistance concerning the SCG shortly before receiving a reconfiguration with sync for the MCG (which may concern a change of MN), the UE does not repeat the procedure. The SCG information may however be transferred via the MN, and in such case, information transferred shortly prior to the reconfiguration with sync for the MCG can be lost (as source MN may not be able to forward it anymore).

Issue 2: Not required repetition of SCG assistance transferred via MN upon change of SN According to current specifications, the UE reports SCG assistance transferred shortly prior to reconfiguration with sync for the SCG. In case the SCG assistance is transferred via MN, it seems possible for MN to forward the information to the T-SN after change of SN is completed. As it seems possible for network to avoid the loss, the repetition by the UE seems not essential.

2.3 Potential Solutions

The solutions for the two issues concern a modification of the UE requirements regarding when to repeat SCG specific assistance, namely the following:

Solution 1: Require UE to repeat SCG assistance transferred via SCG/MN/SRB1 within 1 second prior to reconfiguration with sync for the MCG (issue 1); and Solution 2: Remove the requirement for UE to repeat SCG assistance transferred via SCG/SRB1 within 1 second prior to reconfiguration with sync for the SCG (issue 2)

This can be realized as shown by the following change proposal for 38.331 is provided in FIG. 7 (i.e. changes to Rel-16 RRC (5.3.5.3 Reception of an RRCReconfiguration by the UE) (corresponding changes are needed to 36.331).

2.4 Advantages

The solutions indicated above have the following advantages

Solution 1: In case information is lost, the network may be unable to take the UE preferences into account. As the UE assumes the network received the information, it does not repeat it so the incorrect network action may persist for quite some time. E.g. if the indication that UE no longer prefers power saving is lost, the network may continue to use a low bandwidth and a limited number of carriers resulting in an unwanted low throughput experienced by the UE Solution 2: Merely avoids a requirement on the UE that is not essential i.e. avoiding it will simplify UE implementation 3. Avoiding MDT Logging when Measurements for Target Frequencies are Unavailable 3.1 Introduction A UE that is in an idle or inactive mode may be configured to perform measurement logging for the purpose of Minimization of Drive Test (MDT). This is referred to as logged MDT. Typically, the UE performs periodic logging of the measurements it has available, but in NR the UE can also be configured to log measurements of particular events e.g. when it an Out Of Service condition is met.

Some constraints can be defined regarding when the UE should perform logging e.g. for a limited duration or only when in a particular area (i.e. when camping on a cell that is part of an area that network can set as part of the MDT configuration).

It is furthermore possible for network to specify constraints regarding what the UE shall log. In LTE for example, the UE can be configured to log particular multi-media broadcast multicast services (MBMS) results for a particular frequency. In NR network can also configure a list of neighbouring frequencies for which UE should log results. Although it is clear this list is only meant to cover neighbouring frequencies, it is not clear if network can only include frequencies it also lists in SIB4. It should be noted that the UE normally measures the frequencies listed in SIB4 as the concerned frequencies are candidate for cell re-selection. In particular circumstances, e.g. when serving cell quality is particularly good, measurement of such cells may be skipped by the UE. In such cases, the UE may not have results available for the frequencies listed in SIB4.

It should further be noted that RAN4 defined the concept of early measurement reporting. That is, a UE can be configured to provide results of measurements performed when in an idle or inactive state when (re-)connecting to the network (can include resumption or re-activation). This mechanism can be used by network to (re-)configure SCells as well as the SCG at such (re-)connection times. It should be noted that SCells may be configured on a frequency that is not used for camping i.e. on which the network is e.g. not broadcasting certain system information.

As mentioned, there is ambiguity whether the UE according to current standards is required to log results concerning non-camping frequencies. As may be clear from the previous, the UE may have measurement results available from early measurements it is configured to perform.

3.2 Technical Problem, Basics

As indicated in the previous, the network can configure a list of neighbouring frequencies for which the UE should perform measurement logging for MDT purposes. This can be done by the field interFreqTargetList that is part of the logged MDT configuration. It seems that according to current specification, a UE that is configured to perform measurement logging for a frequency F1 will create a logged measurement result at every periodic interval i.e. when the UE has no results available for the target frequency, the UE still logs results for the serving frequency.

For completeness, we also show the related procedural specification (FIG. 8).

There may be cases in which network is not interested in such measurements e.g. when a particular frequency was newly deployed. If, however, the UE creates a logged measurement entry at every periodic interval, a large portion of the log file may actually concern unwanted information which seems undesirable.

It should be clear that UE may not always have results available for camping frequencies e.g. because it is outside the area in which the concerned frequencies are deployed. It should also be noted that it will be cumbersome and likely infeasible for network to properly suppress logging by setting a corresponding area configuration.

3.3 Potential Solutions

It is possible to ensure the UE only logs the results wanted by the network, to avoid that UE creates a logged measurement entry when the UE has not got results available for frequencies/cells for which network wants results, by a change of the following standards change:

Change interFreqTargetList to a list of target frequencies that may include the serving frequency; and/or Clarify that UE performs logging only when it has measurement results available for frequencies/cells indicated by the targetList field.

This can be realized as shown by the following change proposal for 38.331 (FIG. 9A and FIG. 9B):

3.4 Advantages

The solutions indicated above have the following advantages

Logging of useless information can be avoided, reducing the burden of data storage and data processing both for UE and network Reduces likelihood of discarding relevant data when memory limits are reached 4. Inter-Node Signalling Upon Reconfiguration of PCell when CHO is Configured 4.1 Introduction In release 16 of LTE and NR, standards enhancements were introduced regarding the handling of UE mobility. One such enhancement concerns the definition of a conditional reconfiguration i.e. a reconfiguration that is configured at moment T1 but performed/executed at a later moment T2 when a corresponding condition is met. Such conditional configuration has been defined for change of PCell (referred to as Conditional Handover or CHO) as well as for change of PSCell (referred to as CPC).

For the case of CHO, the target node provides the configuration that UE shall apply when the condition is met i.e. at T2 (execution). Such configuration is defined by a field condRRCReconfig that defines (for the CHO case) the target PCell configuration. More precisely, the field carries the reconfigurations the UE shall perform relative to the current (source) PCell configuration.

It was agreed that it should still be possible to modify the source PCell configuration after CHO/one or more CHO candidate(s) have been configured. As the concerned source PCell configuration is baseline for the configuration in the target PCell for which CHO is configured, the field condRRCReconfig may be affected.

It was further agreed that modification of a CHO configuration due to change of the source PCell configuration is handled by the same RAN3 defined messages as exchanged upon regular handover. The messages were extended by a field that indicates the handover preparation concerns CHO and whether it is an initial configuration or a subsequent modification. This can be seen from the following extracts from 38.423 v16.2.0 shown in FIGS. 10A and 10B. One important point to note is that the Target NG-RAN node To Source NG-RAN node Transparent Container field is mandatory to include in the HANDOVER REQUEST ACKNOWLEDGE. The same applies for other related messages.

4.2 Technical Problem, Basics

The invention concerns the signalling when the source at time T1b wants to modify the source PCell configuration and in particular addresses the following two problems:

It is unclear whether source can always determine if target CHO configuration will be affected by a change of PSCell configuration (and hence can avoid handover preparation when the CHO configuration is not affected); and If source node cannot determine this, what target should signal in response to a handover preparation request, including whether to avoid signalling to the UE in case CHO configuration remains same and if so, how this should be done.

4.3 Potential Solutions

The invention covers the following solutions:

The source is not always able to determine whether CHO configuration may be affected by a change of the source PCell configuration i.e. there are cases in which only the node controlling the candidate target PCell can determine this. In such cases, the source node initiates handover preparation Upon receiving the handover preparation request, the target node may determine that there is no need to modify the CHO configuration (i.e. not affected by source PCell change). In such case, the target node has the following options:

Option A: Return a HANDOVER REQUEST ACKNOWLEDGE including HandoverCommand set to the same value as before Option B: Return a HANDOVER REQUEST ACKNOWLEDGE including a handoverCommandMessage octet string of 0 size 4.5 Advantages In this section, the merits and drawbacks of the different solutions to the problem are considered (Table 3).

TABLE 3

Merits and drawbacks of the different solutions to the problem of internode signalling upon reconfiguration of PCell when CHO is configured.

| Option | Merits (+) and drawbacks (−) |
| --- | --- |
| Option A | − UE is affected i.e. there is useless signalling on the radio interface and useless message processing by the UE |
| Option B | + UE is not affected i.e. no useless signalling on the radio interface and no useless message processing by the UE |

Although a preferred embodiment has been shown and described, it will be appreciated by those skilled in the art that various changes and modifications might be made without departing from the scope of the invention, as defined in the appended claims and as described above.

FIG. 11 is a flow diagram of operation performed by a user equipment according to an embodiment of the present disclosure.

In one embodiment, the user equipment may be configured with Dual Connectivity.

As shown in FIG. 11, in operation 1110, the user equipment may connect to a first master node (MN) via a master cell group (MCG).

In operation 1120, the user equipment may connect to a first secondary node (SN) via a secondary cell group (SCG).

In operation 1130, the user equipment may transmit, to the first SN, the UE assistance information via the first MN. In one embodiment, the UE assistance information may comprise information regarding preference on SCG configuration.

In one embodiment, the UE assistance information may comprise at least one of the following: information regarding overheating assistance; information regarding in device coexistence (IDC) assistance; information regarding preference on the maximum aggregated bandwidth for power saving; information regarding preference on a maximum number of secondary component carriers for power saving; or information regarding preference on discontinuous reception (DRX) parameters for power saving.

In one embodiment, the UE assistance information may be carried by a radio resource control (RRC) message.

In operation 1140, the user equipment may receive, from a base station, a message for reconfiguration with sync for the MCG. In one embodiment, the user equipment may further connect to a second MN via the MCG.

In operation 1150, the user equipment may retransmit, to the first SN, the UE assistance information. In one embodiment, the user equipment may retransmit, to the first SN, the UE assistance information via a second MN within 1 second prior to reconfiguration with sync for the MCG.

In one embodiment, the UE assistance information may be retransmitted to the first SN directly. In yet another embodiment, the UE assistance information may be retransmitted to the first SN via the second MN.

FIG. 12 schematically illustrates a gNB according to an embodiment of the present disclosure.

Referring to the FIG. 12, the gNB (or eNB) 1200 may include a processor 1210, a transceiver 1220 and a memory 1230. However, all of the illustrated components are not essential. The gNB 1200 may be implemented by more or less components than those illustrated in FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the gNB 1200 may be implemented by the processor 1210.

The processor 1210 may detect a PUCCH on a configured control resource set. The processor 1210 determines a method for dividing CBs and a method for rate matching of a PUSCH according to the PUCCH. The processor 1210 may control the transceiver 1220 to receive the PUSCH according to the PUCCH. The processor 1210 may generate HARQ-ACK information according to the PUSCH. The processor 1210 may control the transceiver 1220 to transmit the HARQ-ACK information.

The transceiver 1220 may include a RF transmitter for up-converting and amplifying a transmitted signal, and a RF receiver for down-converting a frequency of a received signal. However, according to another embodiment, the transceiver 1220 may be implemented by more or less components than those illustrated in components.

The transceiver 1220 may be connected to the processor 1210 and transmit and/or receive a signal. The signal may include control information and data. In addition, the transceiver 1220 may receive the signal through a wireless channel and output the signal to the processor 1210. The transceiver 1220 may transmit a signal output from the processor 1210 through the wireless channel.

The memory 1230 may store the control information or the data included in a signal obtained by the gNB 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

FIG. 13 illustrates a user equipment (UE) according to an embodiment of the present disclosure.

Referring to the FIG. 13, the UE 1300 may include a processor 1310, a transceiver 1320 and a memory 1330. However, all of the illustrated components are not essential. The UE 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the UE 1300 may be implemented by the processor 1310.

The processor 1310 may detect a PDCCH on a configured control resource set. The processor 1310 determines a method for dividing CB s and a method for rate matching of a PDSCH according to the PDCCH. The processor 1310 may control the transceiver 1320 to receive the PDSCH according to the PDCCH. The processor 1310 may generate HARQ-ACK information according to the PDSCH. The processor 1310 may control the transceiver 1320 to transmit the HARQ-ACK information.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the UE 1300. The memory 1330 may be connected to the processor 1310 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

In one embodiment, the UE 1300 may be configured with Dual Connectivity. For example, the processor 1310 may be configured to connect to a first master node (MN) via a master cell group (MCG). Also, the processor 1310 may be configured to connect to a first secondary node (SN) via a secondary cell group (SCG).

In one embodiment, the processor 1310 may be configured to transmit, to the first SN, the UE assistance information via the first MN. For example, the UE assistance information may comprise information regarding preference on SCG configuration.

In one embodiment, the UE assistance information may comprise at least one of the following: information regarding overheating assistance; information regarding in device coexistence (IDC) assistance; information regarding preference on the maximum aggregated bandwidth for power saving; information regarding preference on a maximum number of secondary component carriers for power saving; or information regarding preference on discontinuous reception (DRX) parameters for power saving.

In one embodiment, the processor 1310 may be configured to receive, from a base station, a message for reconfiguration with sync for the SCG. In one embodiment, the processor 1310 may be further configured to connect to the second SN via the SCG.

In one embodiment, the processor 1310 may be configured to skip transmission of the UE assistance message to a second SN. For example, the processor 1310 may be configured to skip the transmission of the UE assistance message to the second SN within 1 second prior to reconfiguration with sync for the SCG.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for providing user equipment (UE) assistance information, performed by a UE, the method comprising:
   connecting to a first master node (MN) via a master cell group (MCG);
   connecting to a first secondary node (SN) via a secondary cell group (SCG);
   transmitting, to the first SN, the UE assistance information via the first MN;
   receiving, from a base station, a message for reconfiguration with sync for the MCG; and
   retransmitting, to the first SN, the UE assistance information.

2. The method of claim 1, wherein the retransmitting of the UE assistance information via the second MN to the first SN comprises:
   retransmitting, to the first SN, the UE assistance information via a second MN within 1 second prior to reconfiguration with sync for the MCG.

3. The method of claim 1, further comprises connecting to a second MN via the MCG.

4. The method of claim 1, wherein the UE assistance information comprises information regarding preference on SCG configuration.

5. The method of claim 1, wherein the UE assistance information comprises at least one of the following:
   information regarding overheating assistance;
   information regarding in-device coexistence (IDC) assistance;
   information regarding preference on the maximum aggregated bandwidth for power saving;
   information regarding preference on a maximum number of secondary component carriers for power saving; or
   information regarding preference on discontinuous reception (DRX) parameters for power saving.

6. The method of claim 1, wherein the UE assistance information is retransmitted to the first SN directly.

7. The method of claim 3, wherein the UE assistance information is retransmitted to the first SN via the second MN.

8. The method of claim 1, wherein the UE assistance information is carried by a radio resource control (RRC) message.

9. A user equipment (UE) comprising:
a transceiver; and
at least one processor configured to:
- connect to a first master node (MN) via a master cell group (MCG);
- connect to a first secondary node (SN) via a secondary cell group (SCG);
- transmit, to the first SN, the UE assistance information via the first MN;
- receive, from a base station, a message for reconfiguration with sync for the SCG; and
- skip transmission of the UE assistance message to a second SN.

10. The UE of claim 9, wherein, to skip the transmission of the UE assistance message to the second SN, the at least one processor is configured to:
- skip the transmission of the UE assistance message to the second SN within 1 second prior to reconfiguration with sync for the SCG.

11. The UE of claim 9, the at least one processor is further configured to connect to the second SN via the SCG.

12. The UE of claim 9, wherein the UE assistance information comprises information regarding preference on SCG configuration.

13. The UE of claim 9, wherein the UE assistance information comprises at least one of the following:
- information regarding overheating assistance;
- information regarding in-device coexistence (IDC) assistance;
- information regarding preference on the maximum aggregated bandwidth for power saving;
- information regarding preference on a maximum number of secondary component carriers for power saving; or
- information regarding preference on discontinuous reception (DRX) parameters for power saving.

14. The UE of claim 9, wherein the UE assistance information is carried by a radio resource control (RRC) message.

* * * * *